(12) United States Patent
Cepulis (10) Patent No.: US 6,397,268 B1
(45) Date of Patent: May 28, 2002

(54) TRACKING PCI BUS NUMBERS THAT CHANGE DURING RE-CONFIGURATION

(75) Inventor: Darren John Cepulis, The Woodlands, TX (US)

(73) Assignee: Compaq Information Technologies Group, L.P., Houston, TX (US)

(*) Notice: Subject to any disclaimer, the term of this patent is extended or adjusted under 35 U.S.C. 154(b) by 0 days.

(21) Appl. No.: 09/260,754

(22) Filed: Mar. 2, 1999

Related U.S. Application Data (63) Continuation of application No. 08/725,649, filed on Oct. 1, 1996, now abandoned.

(51) Int. Cl.⁷ .............................................. G06F 13/00
(52) U.S. Cl. ................................ 710/8; 710/9; 710/104
(58) Field of Search .............................. 710/8, 11, 62, 710/63, 64, 128, 104, 107, 1, 5, 9, 10, 19, 101, 102

(56) References Cited

U.S. PATENT DOCUMENTS

| | | | | |
|---|---|---|---|---|
| 5,761,448 A | * | 6/1998 | Adamson et al. | 710/104 |
| 5,854,905 A | * | 12/1998 | Garney | 710/104 |
| 5,878,237 A | * | 3/1999 | Olarig | 710/128 |
| 5,978,860 A | * | 11/1999 | Chan et al. | 710/8 |
| 6,018,810 A | * | 1/2000 | Olarig | 714/43 |
| 6,122,677 A | * | 9/2000 | Porteerfield | 710/10 |
| 6,148,355 A | * | 11/2000 | Mahalingam | 710/104 |
| 6,175,889 B1 | * | 1/2001 | Olarig | 710/129 |
| 6,233,638 B1 | * | 5/2001 | Porterfield | 710/129 |

\* cited by examiner

Primary Examiner—Thomas Lee
Assistant Examiner—Ri Jue Mai
(74) Attorney, Agent, or Firm—Conley, Rose & Tayon, P.C.

(57) ABSTRACT

A computer system having PCI devices, associates bus numbers with these PCI devices during computer system configuration. During startup of the computer system, startup software relies on the bus numbers associated with the PCI devices to find and configure the PCI devices for normal computer system operation. When a PCI/PCI bridge is added to an existing PCI bus, a new PCI bus is created. This may cause the bus numbers of some of the PCI devices to change. Unless the computer system configuration is run again, normal operation of the computer system may not take place because the startup or "boot" program may not be able to find and configure the affected PCI devices without knowing the correct bus numbers. Adding the PCI physical connector slot number to the information derived during the system configuration and storing same in non-volatile RAM enables the computer system to update any PCI device bus numbers that may have changed without having to rerun the system configuration software.

21 Claims, 6 Drawing Sheets

CONFIGURATION REGISTER FORMAT

| DOUBLE WORD # \ BYTE | 3 | 2 | 1 | 0 |
|---|---|---|---|---|
| 00 | DEVICE ID 404 | | VENDOR ID 402 | |
| 01 | STATUS REGISTER | | COMMAND REGISTER | |
| 02 | CLASS CODE | | | REVISION ID |
| 03 | BIST | HEADER TYPE | LATENCY TIMER | CACHE LINE SIZE |
| 04 | BASE ADDRESS 0 | | | |
| 05 | BASE ADDRESS 1 | | | |
| 06 | BASE ADDRESS 2 | | | |
| 07 | BASE ADDRESS 3 | | | |
| 08 | BASE ADDRESS 4 | | | |
| 09 | BASE ADDRESS 5 | | | |
| 10 | CARD BUS CIS POINTER | | | |
| 11 | SUBSYSTEM ID | | SUBSYSTEM VENDOR ID | |
| 12 | EXPANSION ROM BASE ADDRESS | | | |
| 13 | RESERVED | | | |
| 14 | RESERVED | | | |
| 15 | MAX_LAT | MIN_GNT | INTERRUPT PIN | INTERRUPT LINE |

FIG. 4

FREEFROM PCI DEVICE IDENTIFIER AND DATA (ECD_PCIBRDID)

| FIELD | OFFSET | LENGTH | VALUE |
|---|---|---|---|
| BUS NUMBER | 00h | BYTE | VARIES |
| PCI DEVICE AND FUNCTION NUMBER | 01h | BYTE | VARIES |
| PCI DEVICE IDENTIFIER | 02h | WORD | VARIES |
| PCI VENDOR IDENTIFIER | 04h | WORD | VARIES |
| PHYSICAL PCI SLOT NUMBER | 06h | BYTE | VARIES |

FIG. 5

IRQ ROUTING TABLE

| OFFSET | SIZE | DESCRIPTION |
|---|---|---|
| 0 | BYTE | PCI BUS NUMBER |
| 1 | BYTE | PCI DEVICE NUMBER (IN UPPER 5 BITS) |
| 2 | BYTE | LINK VALUE FOR INTA# |
| 3 | WORD | IRQ BIT-MAP FOR INTA# |
| 5 | BYTE | LINK VALUE FOR INTB# |
| 6 | WORD | IRQ BIT-MAP FOR INTB# |
| 8 | BYTE | LINK VALUE FOR INTC# |
| 9 | WORD | IRQ BIT-MAP FOR INTC# |
| 11 | BYTE | LINK VALUE FOR INTD# |
| 12 | WORD | IRQ BIT-MAP FOR INTD# |
| 14 | BYTE | SLOT NUMBER |
| 15 | BYTE | RESERVED |

FIG. 6

TRACKING PCI BUS NUMBERS THAT CHANGE DURING RE-CONFIGURATION

This application is a continuation of Ser. No. 08/725,649 filed Oct. 1, 1996 now abandoned.

BACKGROUND OF THE INVENTION

1. Field of the Invention

The present invention relates to computers that auto-configure peripheral devices connected thereto, and more particularly in determining the peripheral device bus number when another peripheral device bus is added which changes the original peripheral device bus number in the computer.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. A significant part of the ever increasing popularity of the computer, besides its low cost relative to just a few years ago, is its ability to run sophisticated programs and perform many useful and new tasks. Computers today may be easily upgraded with new peripheral devices for added flexibility and enhanced performance.

A major advance in the performance of computers has been the implementation of sophisticated peripheral devices such as video graphics adapters, local area network interfaces, SCSI bus adapters, full motion video and the like. These sophisticated peripheral devices are capable of data transfer rates approaching the native speed of the computer central processing unit ("CPU") or microprocessor. Tie peripheral devices data transfer speeds are achieved by connecting the peripheral devices to the microprocessor and associated random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; and PCI BIOS Specification, revision 2.1. These PCI specifications are available from the PCI Special Interest Group, P.O. Box 14070, Portland, Oreg. 97214.

A computer system has a plurality of informational (data and address) buses such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The central processing unit (CPU) of the computer system communicates with main memory and with the peripherals that make up the computer system over these various buses. The main memory generally communicates over a memory bus through a cache memory bridge to the CPU host bus. The peripherals, depending on their data transfer speed requirements, are connected to the various buses which are connected to the CPU through bus bridges that detect required actions, arbitrate, and translate both data and addresses between the various buses. The choices available for the various computer system bus structures and devices residing on these buses are relatively flexible and may be organized in a number of different ways. One of the more desirable features of present day computer systems is their flexibility and ease in implementing custom solutions for users having widely different requirements.

Another advance in the flexibility and ease in the implementation of personal computers is the emerging "plug and play" standard in which each vendor's hardware has unique coding embedded within the peripheral device. Plug and play software in the computer operating system software auto configures the peripheral devices found connected to the various computer buses such as the various PCI buses, EISA and ISA buses. In addition, the plug and play operating system software configures registers within the peripheral devices found in the computer system as to memory space allocation, interrupt priorities and the like.

Plug and play initialization generally is performed with a system configuration program that is run whenever a new device is incorporated into the computer system. Once the configuration program has determined the parameters for each of the devices in the computer system, these parameters may be stored in non-volatile random access memory (NVRAM). An industry standard for storage of both plug and play and non-plug and play device configuration information is the Extended System Configuration Data (ESCD) format. The ESCD format is used to store detailed configuration information in the NVRAM for each device. This ESCD information allows the computer system BIOS configuration software to work together with the configuration utilities to provide robust support for all peripheral devices, both plug and play, and non- plug and play.

During the first initialization of a computer, the system configuration utility determines the hardware configuration of the computer system including all peripheral devices connected to the various buses of the computer system. Some user involvement may be required for device interrupt priority and the like. Once the configuration of the computer system is determined, either automatically and/or by user selection of settings, the computer system configuration information is stored in ESCD format in the NVRAM. Thereafter, the system configuration utility need not be run again. This greatly shortens the startup time required for the computer system and does not require the computer system user to have to make any selections for hardware interrupts and the like, as may be required in the system configuration utility.

However, situations arise more and more often which require rerunning the system configuration utility to update the device configuration information stored in the NVRAM when a new device is added to the computer system. One specific situation is when a PCI peripheral device interface card having a PCI-PCI bridge is placed into a PCI connector slot of a first PCI bus of the computer system. The PCI-PCI bridge, which creates a new PCI bus, causes the PCI bus numbers of all subsequent PCI buses to increase by one (PCI-PCI bridge may be a PCI interface card having its own PCI bus for a plurality of PCI devices integrated on the card or for PCI bus connector slots associated with the new PCI bus). This creates a problem since any user configured information such as interrupt request (IRQ) number, controller order number, etc., stored in the NVRAM specifies the bus and device/function number of the PCI device to which it applies. Originally, this information was determined and stored in the NVRAM by the system configuration utility during the initial setup of the computer system and contains configuration choices made at that time.

During normal startup of the computer system (every time the computer is turned on by the user), a Power On Self Test (POST) routine depends on prior information stored in the NVRAM by the system configuration utility. If the PCI bus numbers of any of the PCI cards change because a new PCI bus was introduced by adding a new PCI-PCI bridge to the computer, the original configuration information stored in the NVRAM will not be correct for those PCI cards now having different bus numbers, even though they remain in the same physical slot numbers. This situation results in the software operating system not being able to configure the PCI cards now having bus numbers different than what was expected from the information stored in the NVRAM. This can be especially bothersome for a PCI device such as a controller which has been configured as a system startup device, but now cannot be used to startup the computer system because its registers have not been initialized during POST to indicate that it is supposed to be the primary controller.

What is needed is a way for the computer system, during POST, to determine that a PCI bus number has changed for an existing PCI device and to automatically update the computer startup software with the correct bus number so that a PCI device may be used to startup or boot the software operating system. In addition, it is desirable to store the correct bus number in NVRAM for those PCI devices whose bus numbers have changed.

OBJECTS OF THE INVENTION

It is therefore an object of the present invention to initially recognize existing PCI devices on startup even though their PCI bus numbers may have changed.

It is a further object of the present invention to update a computer system hardware configuration table with the correct bus numbers for existing PCI devices whose bus numbers have changed because a new PCI bus was introduced into the computer system.

It is a further object to use the physical card slot number of each PCI device as a reference when determining bus numbers of PCI devices to be configured during POST.

It is a further object to update the computer system NVRAM with a new PCI device bus number when that PCI device has the same physical card slot number but a different PCI bus number then expected.

It is a further object to recognize a PCI device as a startup or boot controller and configure its registers as such even though its PCI bus number has changed.

It is a further object to have a more complete plug and play solution when PCI bus numbers change after adding new PCI/PCI bridges that create new PCI bus numbers in a computer system.

SUMMARY OF THE INVENTION

The above and other objects of the present invention are satisfied, at least in part, when during initial computer system configuration the number of the physical card slot that a PCI card is inserted into is recorded as being associated with that PCI card and device(s). The computer system may then use this physical slot information in conjunction with the PCI device function number to make sure that the PCI bus number is correct prior to executing the PCI device initialization. If there is a change in the bus number of a PCI device which has not been moved from its original physical card slot, then the present invention automatically updates the computer system device information during POST without having to run a new system configuration operation. This gives a more complete plug and play solution even when a PCI device, whose bus address has been changed, must be used for computer system startup.

PCI devices are connected to the computer system CPU through at least one PCI bus. The at least one PCI bus is in communication with the host bus connected to the CPU through a Host/PCI bus bridge. There exists on the computer system motherboard a set of electrical card edge connector sockets or "slots" adapted to receive one PCI card for each slot. These PCI card slots are numbered as to their physical location on the motherboard and define a unique characteristic for each of the respective PCI card slots and the PCI cards plugged therein. The PCI card slots may be interspersed with other ISA or EISA bus connector slots also located on the computer system motherboard.

The PCI bus closest to the CPU, i.e., the PCI bus just on the other side of the host/PCI bridge is always bus number zero. Thus, any PCI device card plugged into a PCI slot connected to the number zero PCI bus is defined as being addressable at PCI bus number zero. Each PCI card comprises at least one PCI device that is unique in the computer system. Each PCI device has a plurality of registers containing unique criteria such as Vender ID, Device ID, Revision ID, Class Code Header Type, etc. Other registers within each PCI device may be read from and written to so as to further coordinate operation of the PCI devices in the computer system. During system configuration,, each PCI device is discovered and its personality information such as interrupt request number, bus master priority, latency time and the like are stored in the system non-volatile random access memory (NVRAM) using, for example, the ESCD format.

The number of PCI cards that may be connected to a PCI bus is limited, however, because the PCI bus is configured for high speed data transfers. The PCI specification circumvents this limitation by allowing more than one PCI bus to exist in the computer system. A second PCI bus may be created by connecting another Host-to-PCI bridge to the host bus of the CPU. The second PCI bus connected to the down stream side (PCI bus side) of the second Host-to-PCI bridle is defined as "number one" if there are no other PCI/PCI bridges connected to the PCI bus number zero.

Other PCI buses may be created with the addition of PCI/PCI bridges. For example, a PCI card having a PCI/PCI bridge is plugged into a PCI slot connected to PCI bus number zero on the motlherboard of the computer system. In this example, bus number zero is the primary bus because the first host/PCI bridge's PCI bus is always numbered zero. The upstream side of the PCI/PCI bridge is connected to PCI bus number zero and the down stream side of the PCI/PCI bridge now creates another PCI bus which is number one. The prior PCI bus number one on the down stream side of the second Host-to-PCI bus now must change to PCI bus number two. All PCI/PCI bridges connected to or down stream of PCI bus number zero are sequentially numbered. This causes the number of the PCI bus that was created by the second Host-to-PCI bridge to be incremented every time a new PCI bus is created with a PCI/PCI bridge down stream from PCI bus number zero.

When two PCI/PCI bridges are connected to the PCI bus number zero, two PCI buses, numbers one and two, are created. For example, a first PCI card having a PCI/PCI bridge is plugged into motherboard PCI slot number 1, creating PCI bus number one with the PCI/PCI bridge of the first PCI/PCI card. A second PCI card having a PCI/PCI bridge is plugged into motherboard PCI slot number 2, creating PCI bus number two with the PCI/PCI bridge of the second PCI card. PCI bus numbers one or two may be connected to PCI devices on the respective first and second PCI cards, or there may be additional PCI card slots on one or both of the first and second PCI cards. When slots are available on a PCI card having a PCI/PCI bridge, additional PCI cards having PCI/PCI bridges may be plugged into the PCI card slots, thus creating more PCI buses. Each PCI/PCI bridge handles information to and from the CPU host bus and a downstream PCI device according to the PCI Specifications referenced above. All embedded PCI devices on the computer system motherboard are assigned a physical slot number of zero (0) and must be differentiated by their respective PCI device and bus numbers.

A computer system may be configured initially with two Host-to-PCI bridges connected to the CPU host bus. This results in the creation of two PCI buses numbered zero and one. These two PCI buses are available for connecting the PCI devices used in the computer system to the CPU. The system configuration program is run once to establish the personality of each of the PCI devices connected to the two PCI buses, to define interrupt priorities and the like. The configuration information for each of the PCI devices and their associated PCI bus numbers may be stored in the NVRAM using the ESCD format. Thereafter each time the computer system is powered up, the configuration information stored in the NVRAM may be used for initializing and configuring the PCI devices during startup of the operating system and eventually running the application programs Initial startup of the computer system is by programs stored in the computer system read only memory (ROM) basic input/output system (BIOS) whose contents may be written into random access memory (RAM) space along with the configuration information stored in the NVRAM so that the computer system may do its startup routines more quickly and then load the operating system software from its hard disk. During the POST routine the computer system depends on the configuration information stored in the NVRAM to access the PCI devices at the PCI bus numbers determined during execution of the original system configuration program.

All of the stored PCI device bus numbers in the NVRAM must match the actual PCI bus numbers for the PCI devices (hard disk SCSI interface, etc.) required during startup of the computer system. If the PCI bus numbers stored in the NVRAM do not match the actual PCI bus numbers, proper computer system operation may be impaired. PCI bus numbers may change if new PCI/PCI bridges are added to the computer system after the configuration program was run to store the system configuration settings in the NVRAM in ESCD format.

According to the present invention, during system configuration the physical PCI slot number is stored in the NVRAM using the PCI ESCD freeform information structure: ECD_PCIBRDID, offset byte 06h. The ECD_PCIBRDID structure also stores the PCI bus number, device/function number, device identifier and vendor identifier in offset bytes 00h, 01h, 021h and 04h, respectively, for each PCI device in the computer system.

The computer system ROM BIOS is configured to include the PCI BIOS function routines which provide a software interface to the computer hardware for implementing PCI devices in the computer. The PCI BIOS function routines are used for generating operations in the PCI specific address spaces (configuration space, and Special Cycles). One of these routines is the "Get PCI Interrupt Routing Options" which is used to return the PCI interrupt routing options available on the system motherboard. The routing information is returned to a data buffer that contains an IRQ routing for each PCI device slot. The IRQ routing table contains, among other entries, the PCI bus number, PCI device number, and PCI physical card slot number.

In the present invention, the PCI bus number, PCI device number and PCI physical slot number are found in both the ESCD freeform information structure ECD_PCIBRDID and IRQ routing table. During computer system startup, the PCI bus number in the IRQ routing table is updated for each PCI device. The ESCD freeform information structure ECD_PCIBRDID stored in the NVRAM, typically, is not updated during system startup. Thus, if a new PCI bus has been introduced into the computer system which alters some of the PCI bus numbers of the existing PCI devices, these bus numbers will not be the same as those stored in the ECD_PCIBRDID configuration. This could have catastrophic results if one of the PCI devices so affected was necessary to load the computer system operating software from hard disk or CD ROM. The present invention resolves the situation of not being able to configure PCI devices at startup if their bus numbers have changed since the last time the system configuration was stored in the ECD_PCIBRDID.

A feature of the present invention is that the startup ROM BIOS software routine checks the contents of the ECD_PCIBRDID against the contents of the IRQ routing table. When the bus numbers do not match for matching PCI device and slot numbers, the PCI device bus number stored in the IRQ routing table is used to replace the incorrect PCI device bus number stored in the NVRAM ESCD structure, ECD_PCIBRDID, In this way, the computer system ROM BIOS software finds the PCI devices which need to be configured for proper computer system startup, just as if the affected PCI device bus numbers had not been changed by the addition of a new PCI bus.

Typically, the contents of the ROM BIOS and NVRAM are copied during startup to the computer system high speed random access memory (RAM) connected to the CPU by the high speed memory bus. Another feature of the present invention is that any bus number changes found during POST of the contents of the IRQ routing table and ECD_PCIBRDID may be corrected by overwriting the RAM locations containing the incorrect bus numbers for the affected PCI devices. The computer system can then utilize the corrected bus numbers in the system RAM to perform the necessary steps for startup and proper operation of the computer system. This feature makes for a more robust and complete plug and play implementation of the computer system.

Still another feature of the present invention is updating the information stored in ESCD format, ECD_PCIBRDID, for each of the existing PCI device bus numbers based on the PCI bus number information found in the IRQ routing table available during early system startup. PCI devices introduced into the computer system which do not have the respective ESCD information stored in NVRAM must still be introduced into the computer system during execution of the system configuration program. However, once such PCI devices have been characterized as to their device and physical slot numbers, and this information is stored in the NVRAM, the present invention can correct for any changing bus number so long as the PCI devices do not change their respective physical slot positions.

An advantage of the present invention is that the introduction of a PCI card having a PCI/PCI bridge which changes PCI bus numbers of other existing PCI devices will not detrimentally effect operation of the computer system.

Another advantage of the present invention is that the computer system is able to safely tolerate more diverse configurations of PCI cards without losing its plug and play capabilities.

Still another advantage is to be able to differentiate between embedded PCI devices each having physical slot number zero by using the correct bus number for each embedded device and the respective "Devsel#" signal.

Other and further objects, features and advantages will be apparent from the following description of presently preferred embodiments of the invention, given for the purpose of disclosure and taken in conjunction with the accompanying drawings.

DETAILED DESCRIPTION OF A PREFERRED EMBODIMENT

The present invention is a method and system for automatically updating a peripheral component interconnect (PCI) device bus number when that bus number has changed due to new PCI buses being introduced into the computer system after the configuration utility program was executed. The present invention recognizes existing PCI devices at initial system startup even though the PCI device bus numbers have changed since the last time the computer system was configured. Once recognized, the correct bus number for each PCI device is stored in the computer system memory containing the read only memory (ROM) basic input/output system (BIOS) and PCI BIOS device information tables so that subsequent program actions may utilize the correct PCI bus number for each PCI device during configuration thereof. This is especially important when a PCI device must be used to complete startup of the computer system, such as a PCI disk controller or local area network interface. Additionally, the revised PCI device bus numbers may be written to the non-volatile random access memory (NVRAM) that stores PCI device information obtained during system configuration.

For illustrative purposes a preferred embodiment of the present invention is described hereinafter for computer systems utilizing the Intel .X86 microprocessor architecture and certain terms and references will be specific to that processor platform. The Peripheral Component Interconnect bus ("PCI") is an interface standard, however, that is hardware independent and may be utilized with any host computer designed for the PCI interface standard. It will be appreciated by those skilled in the art of computer systems that the present invention may be adapted and applied to any computer platform utilizing the PCI interface standard.

Figure 1:
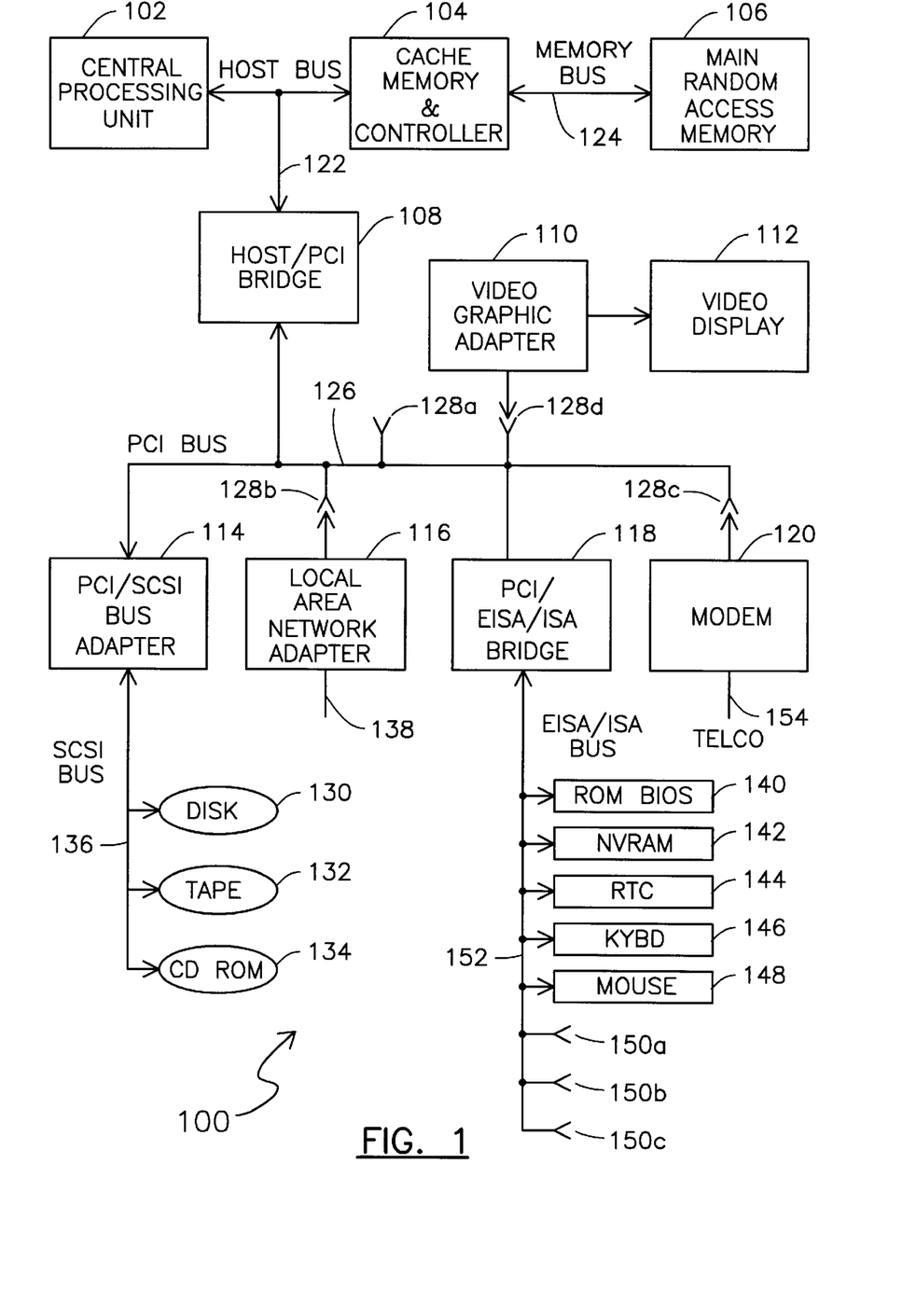
FIG. 1 is a schematic block diagram of a computer system.

Referring now to the drawings, the details of a preferred embodiment of the present invention are schematically illustrated. Like elements in the drawings will be represented by like numbers, and similar elements will be represented by like numbers with a different lower case letter suffix. Referring to FIG. 1, a schematic block diagram of a computer system utilizing the present invention is illustrated. A computer system is generally indicated by the numeral 100 and comprises a central processing unit (CPU) 102, a cache memory and controller 104, a main random access memory (RAM) 106, a host/PCI bridge 108, a video graphic adapter 110, a video display 112, a PCI/SCSI bus adapter 114, a local area network adapter 116, a PCI/EISA/ISA bridge 118, and a modem 120. The CPU 102 is connected to the host/PCI bridge 108, and cache memory and controller 104 through a host bus 122. The main RAM 106 is connected to the cache memory and controller 104 through a memory bus 124.

A PCI bus 126 connects the host/PCI bridge 108 to the PCI/SCSI bus adapter 114, local area network adapter 116, PCI/EISA/ISA bridge 118 and modem 120. In addition there is a PCI board slot 128*a* for an additional PCI device board (not illustrated). Some of the PCI devices is (video graphic adapter 110, local area network adapter 116 and modem 120) plug into other PCI board slots 128*b*, 128*c* and 128*d*. The PCI board slots 128 are typically mounted on the computer system motherboard (not illustrated) and have physical slot numbers 1, 2, 3, 4, etc., associated therewith. Some of the PCI devices (PCI/SCSI bus adapter 114 and PCI/EISA/ISA bridge 118) are mounted on the motherboard and are referenced as being in PCI physical slot number 0. One PCI bus 126 is illustrated in FIG. 1, and is generally referred to as PCI bus number zero.

Disk 130, tape drive 132 and CD-ROM drive 134 connect to the PCI/SCSI bus adapter 114 through a SCSI bus 136. The local area network (LAN) adapter 116 is connected to a local area network 138. The PCI/EISA/ISA bridge connects to a ROM BIOS 140, non-volatile random access memory (NVRAM) 142, real time clock (RTC) 144, system keyboard 146, mouse 148 and EISA/ISA board slots 150*a*–150*c* over a EISA/ISA bus 152. The modem 120 is connected to a telephone line 154. The EISA/ISA bus 152 is a slower information bus than the PCI bus 126, but it costs less to interface with the EISA/ISA bus 152.

When the system 100 is first turned on, start-up information stored in the ROM BIOS 140 is used to begin operation thereof. Basic setup instructions are stored in the ROM BIOS 140 so that the computer system 100 can load more complex operating system software from a memory storage device such as the disk 130. Before the operating system software can be loaded, however, certain hardware in the computer system 100 must be configured to properly transfer information from the disk 130 to the CPU 102. In the computer system 100 illustrated in FIG. 1, the PCI/SCSI bus adapter 114 must be configured to respond to commands from the CPU 102 over the PCI bus 126, and transfer information from the disk 130 to the CPU 102 via buses 136, 126 and 122. The PCI/SCSI bus adapter 114 is a PCI device and remains platform independent. Therefore, separate hardware independent commands are used to setup and control any PCI device in the computer system 100. These hardware independent commands, however, are located in a PCI BIOS contained in the computer system ROM BIOS 140. The PCI BIOS is firmware that is hardware specific but meets the general PCI specification. Plug and play, and PCI devices in the computer system are detected and configured when a system configuration program is executed. The results of the plug and play, and PCI device configurations are stored in the NVRAM 142 for later use by the startup programs in the ROM BIOS 140 and PCI BIOS which configure the necessary computer system 100 devices during startup.

Figure 2:
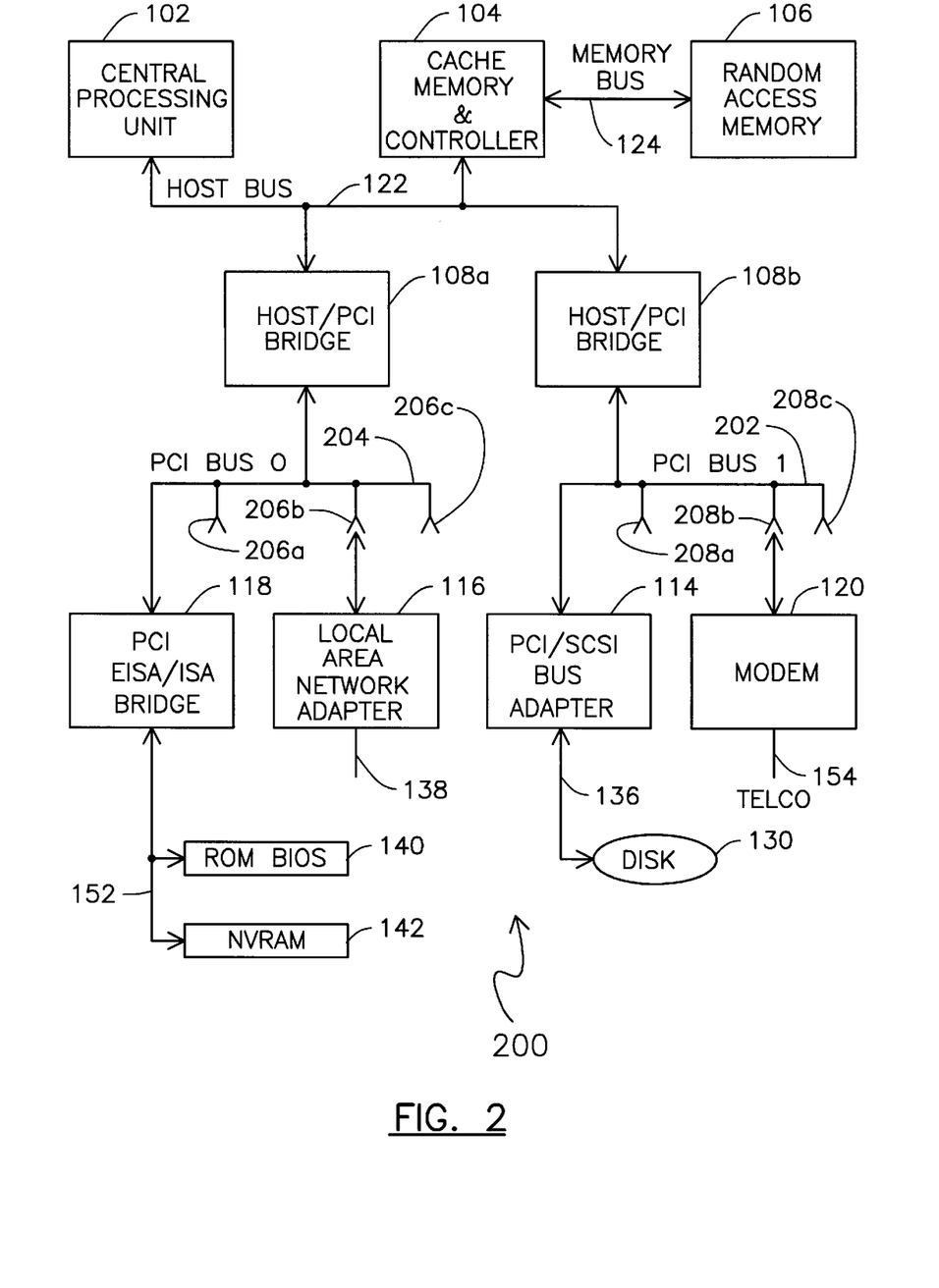
FIG. 2 is a schematic block diagram of a computer system illustrating two Host/PCI bridges and PCI buses.

Referring now to FIG. 2, a schematic block diagram of a computer system 200 having two host/PCI bridges and two PCI buses is illustrated. The computer system 200 is similar to the computer system 100 illustrated in FIG. 1, but with the addition of a second PCI bus 202. A first PCI bus 204 is similar to the PCI bus 126 of FIG. 1. PCI buses 202 and 204 are numbered one and zero, respectively. Multiple PCI buses are typically used in a computer system because of the restriction on the number of PCI devices that may be connected to a PCI bus. PCI bus 204 is numbered zero because it is the closet PCI bus to the host bus 122. PCI bus 202 is numbered one because PCI buses are numbered consecutively and there are no other PCI/PCI bridges connected to the number zero PCI bus 204.

In the computer system 200, the PCI devices are divided between the two PCI buses 202 and 204. The PCI/EISA/ISA bridge 118 and LAN adapter 116 are connected to the number zero PCI bus 204. The PCI/SCSI bus adapter 114 and modem 120 are connected to the number one PCI bus 202. Motherboard PCI slots 206a–206c (slots 206a and 206c are empty and slot 206b is connected to the LAN adapter 116) are connected to the number zero PCI bus 204, and PCI slots 208a–208c (slots 208a and 208c are empty and slot 208b is connected to the modem 120) are connected to the number one PCI bus 202. For illustrative purposes hereinafter, the PCI slots 206a–206c and 208a–208c are assigned physical slot numbers 1, 2, 3, 4, 5 and 6, respectively. These physical PCI slot numbers are associated with PCI devices connected to each of the PCI slots 206a–206c and 208a–208c. Embedded PCI devices located on the motherboard are directly connected to either of the PCI buses 202 and 204. The embedded PCI devices are not associated with any of the physical PCI slots on the motherboard, but rather, are defined as being in PCI slot number 0.

Figure 3:
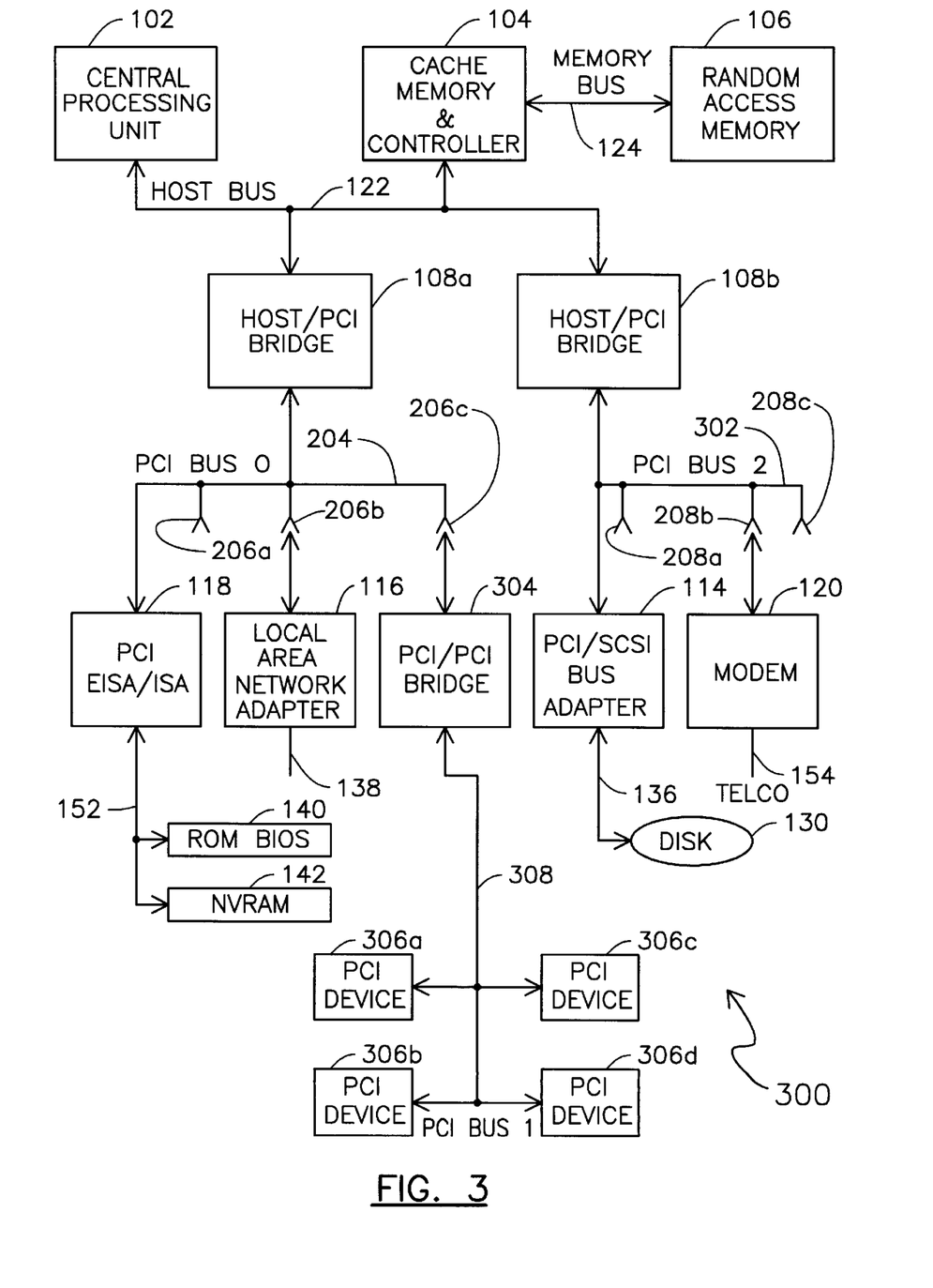
FIG. 3 is a schematic diagram of the computer system of FIG. 2, illustrating three PCI buses and a PCI/PCI bridge.

Referring now to FIG. 3, a schematic block diagram of a computer system 300 having two host/PCI bridges, one PCI/PCI bridge and three PCI buses is illustrated. The computer system 300 is similar to the computer system 200 illustrated in FIG. 2, but with the addition of a third PCI bus 308. PCI buses 308 and 204 are numbered one and zero, respectively. PCI bus 204 is numbered zero because it is the closet PCI bus to the host bus 122. PCI bus 308 is numbered one because PCI bus 308 is the secondary bus of PCI/PCI bridge 304. PCI devices 306a–306c are connected to PCI bus 308. The PCI devices 306a–306c and PCI/PCI bridge 304 may be all on one PCI card which is inserted into PCI slot 206c. PCI bus 302 is now designated as PCI bus number two (compare. PCI bus 202, bus number one of FIG. 2).

The PCI/SCSI bus adapter 114 and modem 120 are still located in physical slot numbers 0 and 5, but the PCI devices are now connected to PCI bus number two, where before the PCI bus number was one. Even though the PCI/SCSI bus adapter 114 and modem 120 have not moved from their original physical slot locations 0 and 5, respectively, the PCI bus number associated with these two PCI devices has incremented by one. This is the result of adding the PCI/PCI bridge 304 at PCI bus number zero (PCI bus 204). The PCI/SCSI bus adapter 114 and modem 120 PCI devices now are associated with a different PCI bus number then what is stored for these PCI devices in the NVRAM based on the last system configuration executed. The complete system 300 may not properly boot from the disk 130 because the PCI/SCSI bus adapter 114 may not be configured properly from the PCI BIOS in the ROM BIOS 140.

Figure 4:
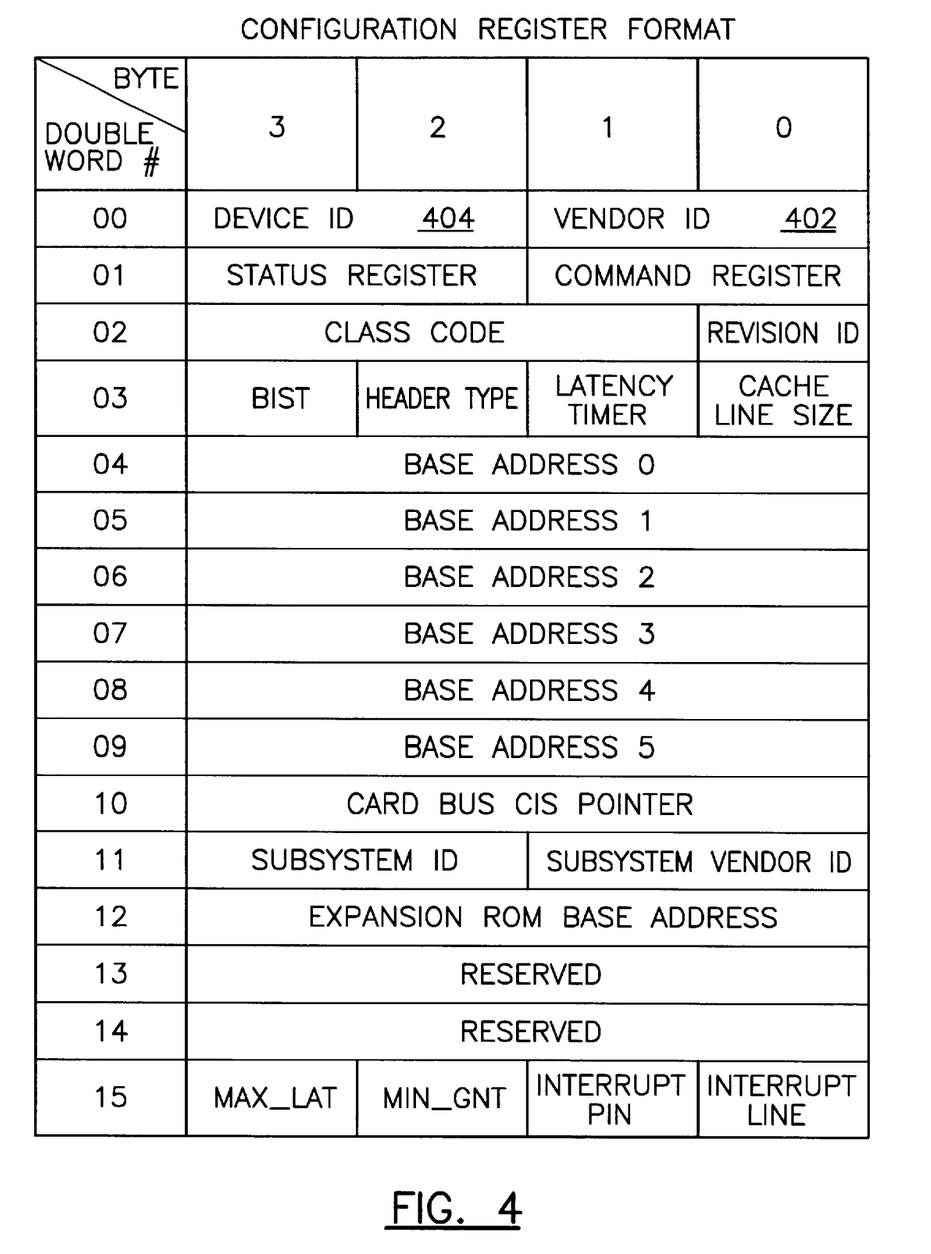
FIG. 4 is a schematic layout of the configuration register format entries for a PCI device.

Referring now to FIG. 4, a schematic layout of the configuration register format of a PCI device is illustrated. This configuration register format is found in each PCI device connected to the computer system. Some of the registers must be configured to properly run the PCI device and other registers are read only for identifying the PCI device to the computer system and to give the computer system its characteristics. Each PCI device has unique Vendor and Device identifiers, Vendor ID 402 and Device ID 404, respectively. The Vendor ID 402 identifies the manufacturer of the PCI device, and the Device ID 404 identifies the type of PCI device.

There is a standard used for plug and play devices (e.g., PCI, Plug and Play ISA) on computer platforms that include a standard expansion bus (e.g., ISA, EISA). Storage in NVRAM 142 of device information for both non-plug and play, and plug and play devices may use an industry standard called the "Extended System Configuration Data" or "ESCD" format. The ESCD format is utilized to store configuration information about Dynamically Configurable Devices (DCDs). There are two types of DCDs: PCI devices, and Plug and Play ISA devices. For proper configuration and operation of DCDs, certain information needs to be stored as Extended Configuration Data (ECD) in a free form data format.

In the ROM BIOS 140 there is an Auto-Configuration BIOS that contains extensions to configure DCDs as required. The design of the Auto-Configuration BIOS requires that the location of each specific PCI device be determined. This in turn necessitates the use of the PCI device bus number, the device/function number and the device ID 404 and Vendor ID 402. This PCI specific information is kept in a "Freeform PCI Device Identifier and Data Structure" or "ECD__PCIBRDID structure" and is stored in the NVRAM 142.

Figure 5:
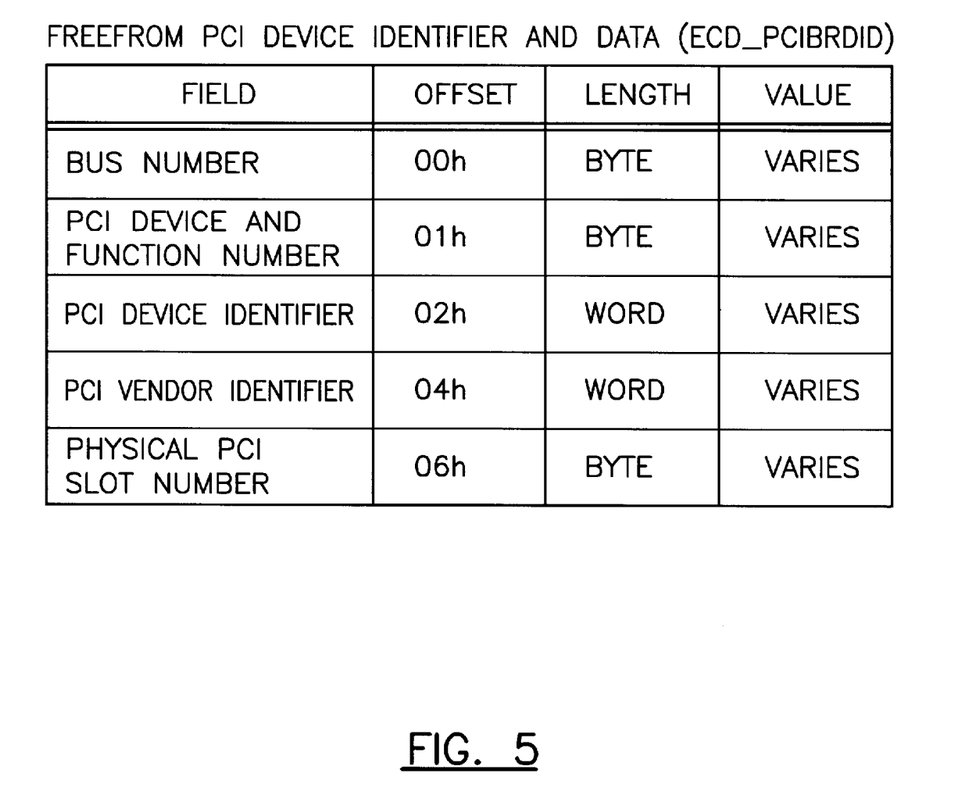
FIG. 5 is a schematic layout of the EISA ESCD freeform PCI device identifier and data entries, according to the present invention.

Referring now to FIG. 5, a schematic layout of the ECD__PCIBRDID structure is illustrated. The standard ECD__PCIBRDID structure stores the PCI bus number after being determined during the system configuration, PCI device and function number, PCI device Identifier (Device ID 404), and PCI Vendor Identifier (Vendor ID 402). In addition, the system and method of the present invention stores the physical PCI slot number in the ECD__PCIBRDID structure at offset 06h. The combination of the PCI device Vendor ID 402, Device ID 404 and physical PCI slot number are unique for each PCI device in the computer system and will not change unless the PCI device is physically moved to another physical PCI slot.

Figure 6:
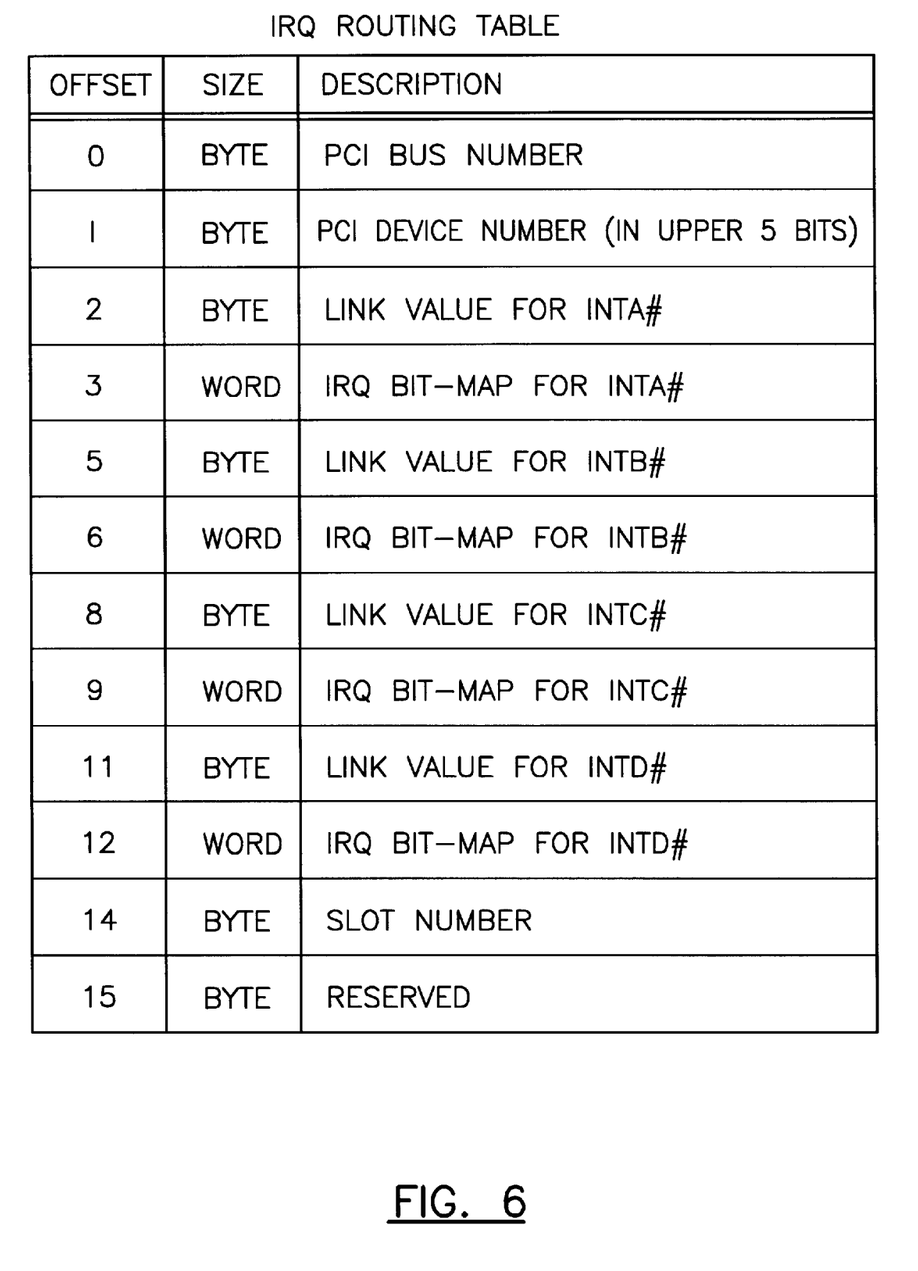
FIG. 6 is a schematic layout of the PCI BIOS specification IRQ routing table entries.

Referring now to FIG. 6, a schematic layout of the PCI BIOS Specification IRQ routing table entries is illustrated, The PCI BIOS Specification is a document that describes the software interface presented by the PCI BIOS functions which are embedded in the ROM BIOS 140. The PCI BIOS Specification interface provides a hardware independent method of managing PCI devices in a host computer. One of the PCI BIOS Specification software routines is "Get PCI Interrupt Routing Options." This routine returns the PCI interrupt routing options available on the system motherboard. Routing information is returned in a data buffer that contains an IRQ Routing for each PCI device or slot. The IRQ Routing Table, illustrated in FIG. 6, stores entries defining a specific PCI device.

The slot number value at offset 14 is used to communicate whether the table entry is for a motherboard embedded device (slot number 0) or an add-in PCI slot. Each of the add-in PCI slots has a number value corresponding to the physical placement of the slot on the computer system motherboard. This provides a way to correlate physical slots (offset 14) with PCPCI bus and device numbers (offset 0 and 1, respectively).

Each PCI/PCI bridge has three bus number registers. The three bus number registers are: 1) Primary bus number register, 2) Secondary bus number register, and 3) Subordinate bus number register. During POST at startup, the primary bus number register is initialized with the bridge's bus number that is closer to the host processor. The secondary bus number register is initialized with the bridge's bus number that is further from the host processor or "behind" the bridge (i.e., the bridge side that is opposite the host processor). The subordinate bus number register is initialized with the highest PCI bus number that exists behind the bridge. If there are no PCI/PCI bridges on the secondary bus, the subordinate bus number register is initialized with the same bus number value as the secondary bus number register.

At the beginning of POST, the startup configuration software is only aware of the existence of PCI bus zero. The startup configuration software must build a picture of the bus "tree" that represents the computer system topology. This is accomplished by "walking" the base PCI bus (bus zero) and searching for PCI/PCI bridges. When a PCI/PCI bridge is discovered, the startup configuration software walks the secondary bus of the discovered PCI/PCI bridge in an attempt to discover other PCI/PCI bridges. The startup configuration software continues to walk all PCI buses it discovers until all PCI buses behind the first PCI/PCI bridge have been discovered. As each PCI bus is discovered the startup configuration software assigns it a bus number, and then goes back and updates the subordinate bus number registers in each upstream PCI/PCI bridge, including the host/PCI bridge.

When a complete picture of the tree branch that extends behind the first PCI/PCI bridge has been built, the startup configuration software searches for other PCI/PCI bridges stemming from the first PCI bus (bus zero) and builds pictures of the branch behind each of the other PCI/PCI bridges as described above. The bus number assigned to each PCI bus that resides behind a PCI/PCI bridge must be a value greater than the bridge's secondary bus number and less then or equal to the value placed in its own subordinate bus number register.

Once each PCI bus number has been enumerated as described above, the correct PCI bus number for each PCI device is updated in the IRQ Routing Table (FIG. 6) using the corresponding PCI device and PCI slot number. Thus, the IRQ Routing Table always has the correct bus number for each PCI device in the computer system.

In contrast to the IRQ Routing Table being updated each time during POST, the ECD_PCIBRDID structure stored in the NVRAM is only updated when the system configuration program is run. The present invention compares the common entries of the IRQ Routing Table (FIG. 6) and the ECD_PCIBRDID Structure (FIG. 5). If the common entries match for the PCI device and physical slot numbers but the PCI bus numbers do not, then the system and method of the present invention will replace the PCI bus number in the ECD_PCIBRDID structure with the PCI bus number found in the IRQ Routing Table. This all occurs before the startup software configures the ESCD input-output and IRQ initializations, and completes the PCI device auto configuration.

The present invention will update a bus number entry that has changed for a PCI device in the RAM 106 memory space used by the alias of the ROM BIOS and NVRAM. Optionally, the changed PCI bus number stored in NVRAM ECD_PCIBRDID format can also be updated so that the next time the computer system starts up, there will be no mismatch between the IRQ Routing Table and ECD_PCIBRDID bus number entries.

The present invention, therefore, is well adapted to carry out the objects and attain the ends and advantages mentioned, as well as others inherent therein. While a presently preferred embodiment of the invention and various aspects thereto have been given for purposes of disclosure, numerous changes in the details of construction, interconnection and arrangement of the invention will readily suggest themselves to those skilled in the art and which are encompassed within the spirit of tie invention and the scope of the appended claims.

While the present invention has been depicted, described, and is defined by reference to a particularly preferred embodiment of the invention, such reference does not imply a limitation on the invention, and no such limitation is to be inferred. The invention is capable of considerable modification, alternation, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A computer system wherein peripheral device characteristics are automatically updated whenever a characteristic changes, said system comprising:

a central processing unit connected to a host bus and a main random access memory;

a first bus bridge connecting the host bus to a first peripheral component interconnect (PCI) bus;

a second bus bridge connecting the host bus to a second peripheral component interconnect (PCI) bus;

a plurality of PCI devices connected to the first and second PCI buses;

a read only memory (ROM) basic input/output system (BIOS) connected to the central processing unit;

a non-volatile random access memory (NVRAM) connected to the central processing unit;

the ROM BIOS having computer system startup instructions and PCI BIOS instructions, the PCI BIOS instructions determining characteristics for each of the plurality of PCI devices in the computer system during startup;

the NVRAM having stored characteristics and configuration information for each of the plurality of PCI devices, the characteristics and configuration information determined during configuration of the computer system and the plurality of PCI devices;

logic for comparing the characteristics of each of the plurality of PCI devices determined by the PCI BIOS instructions during startup with the characteristics of each of the plurality of PCI devices stored in the NVRAM; and logic for substituting the characteristics stored in the NVRAM of each of the plurality of PCI devices with the characteristics of each of the plurality of PCI devices determined by the PCI BIOS instructions during startup that are different from those found in the NVRAM so that a pre-existing PCI device may be found and configured even if its PCI bus number has changed.

2. The computer system of claim 1, wherein the characteristics of each of the plurality of PCI devices determined by the PCI BIOS instructions include a determined PCI bus number, a PCI device number and a PCI physical slot number.

3. The computer system of claim 2, wherein the characteristics of each of the plurality of PCI devices stored in NVRAM include a stored PCI bus number, the PCI device number, a PCI function number, a PCI device identifier, a PCI vendor identifier and the PCI physical slot number.

4. The computer system of claim 3, wherein the comparison logic compares the PCI bus numbers stored in the NVRAM and the PCI bus numbers determined by the PCI BIOS instructions during startup by matching the PCI device numbers and PCI physical slot numbers for each of the plurality of PCI devices stored in the NVRAM and determined by the PCI BIOS instructions during startup.

5. The computer system of claim 4, wherein the substitution logic substitutes the PCI bus numbers stored in the NVRAM with the PCI bus numbers determined by the PCI BIOS instructions during startup for each PCI bus number that does not match.

6. The computer system of claim 1, wherein some of the plurality of PCI devices are connected to the first and second PCI buses through PCI connector slots, each PCI connector slot having a unique PCI physical slot number 1 to N, where N is a positive integer number.

7. The computer system of claim 1, wherein some other of the plurality of PCI devices are connected to the first and second PCI buses directly and have a PCI physical slot number of zero.

8. The computer system of claim 1, wherein the first PCI bus is number zero and the second PCI bus is number one, unless one or more of the plurality of PCI devices has a third bus bridge which connects the first PCI bus which is number zero to a third PCI bus which is then PCI bus number one, and the second PCI bus becomes number two.

9. The computer system of claim 1, wherein software instructions contained in the ROM BIOS are stored in the main random access memory before the central processing unit executes the software instructions during computer system startup.

10. The computer system of claim 1, wherein the characteristics and configuration information stored in NVRAM for each of the plurality of PCI devices is stored in the main random access memory and available for use during computer system startup.

11. The computer system of claim 1, wherein still other of the plurality of PCI devices are connected directly to the first and second PCI buses without using a PCI connector slot but being associated with a PCI connector slot number of zero.

12. A computer system wherein PCI bus numbers associated with PCI devices are automatically updated during startup of the computer system whenever a PCI bus number has changed, said system comprising:
a computer system motherboard comprising a central processing unit connected to a host bus and a main random access memory;
a first bus bridge connecting the host bus to a first peripheral component interconnect (PCI) bus;
a second bus bridge connecting the host bus to a second peripheral component interconnect (PCI) bus;
a plurality of first and second PCI connector slots on the motherboard, the plurality of first PCI connector slots connected to the first PCI bus and the plurality of second PCI connector slots connected to the second PCI bus, wherein each of the first and second PCI connector slots has a unique physical slot number on the motherboard;
a plurality of PCI devices connected to the first and second PCI buses, some of the plurality of PCI devices connected to the first PCI bus through the plurality of first PCI connector slots and some other of the plurality of PCI devices connected to the second PCI bus through the plurality of second PCI connector slots;
a read only memory (ROM) basic input/output system (BIOS) connected to the central processing unit;
a non-volatile random access memory (NVRAM) connected to the central processing unit;
the ROM BIOS having computer system startup instructions and PCI BIOS instructions, the PCI BIOS instructions determining PCI bus numbers, PCI device numbers and PCI connector slot numbers associated with each of the plurality of PCI devices in the computer system during startup;
the NVRAM storing PCI device information, the PCI device information comprising PCI bus numbers, PCI device and function numbers, PCI device identifier, PCI vendor identifier and PCI connector slot numbers for each of the plurality of PCI devices, the stored PCI device information determined during configuration of the computer system and the plurality of PCI devices;
logic for comparing the PCI bus numbers, PCI device numbers and PCI connector slot numbers of each of the plurality of PCI devices determined by the PCI BIOS instructions during startup with the PCI bus numbers, PCI device numbers and PCI connector slot numbers, respectively, of each of the plurality of PCI devices stored in the NVRAM; and
logic for substituting the PCI bus numbers stored in the NVRAM with the PCI bus numbers determined by the PCI BIOS instructions during startup that are different from those found in the NVRAM so that a pre-existing PCI device may be found and configured even if its PCI bus number has changed.

13. The computer system of claim 12, wherein the PCI device information stored in NVRAM for each of the plurality of PCI devices and the software instructions contained in the ROM BIOS are stored in the main random access memory before the central processing unit executes the software instructions during computer system startup.

14. The computer system of claim 13, further comprising updating the PCI bus numbers from the NVRAM stored in the main random access memory with the PCI bus numbers determined by the PCI BIOS instructions.

15. The computer system of claim 12, further comprising updating the PCI bus numbers stored in the NVRAM that are different from the PCI bus numbers determined by the PCI BIOS instructions.

16. A method of automatically updating PCI bus numbers associated with PCI devices in a computer system during startup thereof, said method comprising the steps of:
determining first PCI information for a plurality of PCI devices in a computer system during startup thereof, the first PCI information comprising PCI bus numbers, PCI device numbers and PCI physical slot numbers for each of the plurality of PCI devices;
reading second PCI information stored in non-volatile random access memory (NVRAM) of the computer system, the second PCI information comprising PCI bus numbers, PCI device and function numbers, PCI device identifiers, PCI vendor identifiers and PCI physical slot numbers for each of the plurality of PCI devices;

comparing the first PCI information and second PCI information which is common to determine if any of the PCI bus numbers of the first PCI information are different from the PCI bus numbers of the second PCI information; and using the PCI bus numbers of the first PCI information whenever the PCI bus numbers of the second PCI information are different so that a pre-existing PCI device may be found and configured even if its PCI bus number has changed.

17. The method of claim 16, further comprising the step of replacing the PCI bus numbers of the second PCI information which are different with the PCI bus numbers of the first PCI information.

18. The method of claim 16, further comprising the steps of:

writing the second PCI information into main random access memory of the computer system; and writing the PCI bus numbers of the first PCI information into the main random access memory whenever the PCI bus numbers of the second PCI information are different.

19. The method of claim 16, further comprising the step of writing the PCI bus numbers of the first PCI information into the NVRAM of the computer system whenever the PCI bus numbers of the second PCI information are different.

20. A method of correcting PCI bus numbers associated with PCI devices in a computer system during power on self test (POST) when a PCI bus has been added to the computer system, said method comprising the steps of:

assigning PCI bus numbers to each of the PCI devices in the computer system;

updating an PCI IRQ routing table during computer system startup with the PCI bus numbers assigned to each of the PCI devices along with PCI device numbers and PCI physical slot numbers for each of the PCI devices;

reading ESCD information from an ESCD freeform PCI device identifier and data table (ECD_PCIBRDID), the ESCD information comprising PCI bus numbers, PCI device numbers and PCI function numbers, PCI device identifiers, PCI vendor identifiers and PCI physical slot numbers for each of the PCI devices in the computer system at the time of the last system configuration;

matching the PCI device numbers and PCI physical slot numbers found in the PCI IRQ routing table and ECD_PCIBRDID for each of the PCI devices;

comparing the PCI bus numbers found in the PCI IRQ routing table and ECD_PCIBRDID of the PCI devices having matching PCI devices numbers and PCI physical slot numbers; and using the PCI bus numbers from the ECD_PCIBRDID if they match the PCI bus numbers found in the PCI IRQ routing table, if the PCI bus numbers from the ECD_PCIBRDID do not match the PCI bus numbers found in the PCI IRQ routing table then using the PCI bus numbers found in the PCI IRQ routing table to initialize and configure the PCI devices so that a pre-existing PCI device may be found and configured even if its PCI bus number has changed.

21. The method of claim 20, further comprising the step of replacing the PCI bus numbers in the ECD_PCIBRDID with the PCI bus numbers found in the PCI IRQ routing table when the PCI bus numbers do not match.

* * * * *